United States Patent
Warwick et al.

[11] Patent Number: 6,076,971
[45] Date of Patent: Jun. 20, 2000

[54] ENGINE BLOCK BEARING SADDLE REINFORCING INSERTS

[75] Inventors: Michael J. Warwick; Martin R. Myers; Yong Ching Chen, all of Columbus; Paul C. Becker, Bloomington; Richard Belush, Columbus, all of Ind.

[73] Assignee: Cummins Engine Company, Inc., Columbus, Ind.

[21] Appl. No.: 09/153,460

[22] Filed: Sep. 15, 1998

Related U.S. Application Data

[63] Continuation-in-part of application No. 08/886,570, Jul. 1, 1997, Pat. No. 5,816,710.

[51] Int. Cl.$^7$ .................................................. F16C 9/02
[52] U.S. Cl. .................................................. 384/433
[58] Field of Search .................................... 384/433, 432, 384/438, 441, 273, 294

[56] References Cited

U.S. PATENT DOCUMENTS

| | | |
|---|---|---|
| 1,865,299 | 6/1932 | Berry . |
| 2,098,451 | 11/1937 | Gilmore . |
| 2,729,523 | 1/1956 | von Lassberg et al. . |
| 3,304,134 | 2/1967 | Allen . |
| 4,023,613 | 5/1977 | Uebayasi et al. . |
| 4,412,514 | 11/1983 | Hayakawa et al. . |
| 4,465,041 | 8/1984 | Hayashi . |
| 4,467,755 | 8/1984 | Hayashi . |
| 4,520,771 | 6/1985 | Hayashi . |
| 4,567,865 | 2/1986 | Yasutake . |
| 4,643,145 | 2/1987 | Bolton et al. . |
| 4,684,267 | 8/1987 | Fetouh . |
| 4,693,216 | 9/1987 | Ampferer et al. . |
| 4,848,292 | 7/1989 | Holtzberg . |
| 4,884,900 | 12/1989 | Pirault et al. . |
| 5,107,809 | 4/1992 | Suh . |
| 5,183,025 | 2/1993 | Jorstad et al. . |
| 5,203,854 | 4/1993 | Nilsson et al. . |
| 5,218,938 | 6/1993 | Miller et al. . |
| 5,333,668 | 8/1994 | Jorstad et al. . |
| 5,370,087 | 12/1994 | Guimond et al. . |
| 5,501,529 | 3/1996 | Cadle et al. . |
| 5,551,782 | 9/1996 | Arnhold et al. . |
| 5,611,301 | 3/1997 | Gillbrand et al. . |
| 5,676,105 | 10/1997 | Schwaderlapp et al. . |

FOREIGN PATENT DOCUMENTS

735087  8/1955  United Kingdom .

*Primary Examiner*—Lenard A. Footland
*Attorney, Agent, or Firm*—Nixon Peabody LLP; Charles M. Leedom, Jr.; Tim L. Brackett, Jr.

[57] ABSTRACT

A reinforcing insert for an engine block formed of an engine block material is provided which is positioned in the bearing saddle area of the block for increasing the strength and stiffness of the bearing saddle area to ensure a secure connection of the main bearing cap throughout engine operation thereby ensuring proper crankshaft support and operation. The reinforcing insert is formed of a material having a higher modulus of elasticity than a modulus of elasticity of the engine block material. The insert includes a lower transverse surface for positioning at a lowermost position in the engine block, an upper surface positioned farthest from the crankshaft, a first and second linear side surfaces for positioning on opposite sides of the crankshaft. The linear sides extend from the lower surface along respective planes in nonparallel relation to each other. The linear sides may extend either in a converging or a diverging manner from the lower surface. Alternatively, the insert may include two cylindrical inserts positioned in bores formed in the block on opposite sides of the crankshaft. These insert designs provide strengthening and stiffening of the block over an optimum area while permitting secure attachment of a main bearing cap to the block.

6 Claims, 5 Drawing Sheets

ENGINE BLOCK BEARING SADDLE REINFORCING INSERTS

This is a continuation-in-part application of Ser. No. 08/886,570, filed Jul. 1, 1997, now U.S. Pat. No. 5,816,710.

TECHNICAL FIELD

This invention relates to a reinforcing insert for positioning in a bearing saddle region of an engine block which effectively increases the strength and fatigue resistance of the block while reducing the overall strain in the bearing saddle.

BACKGROUND OF THE INVENTION

Heavy duty diesel engines generate high cylinder pressures which create a large amount of strain in the engine block during the power stroke of the piston. This strain induces bending loads on the crankshaft connected to the pistons and, in turn, the crankshaft bearings. Typically, engine blocks are formed of a ferrous material, such as cast iron, capable of withstanding the pressure induced strains. However, engine blocks may also be formed of a low density material, such as an aluminum alloy, instead of cast iron, to advantageously increase the power density, i.e. horsepower produced per pound of engine weight. Aluminum or aluminum alloys, while having the advantage of being light in weight, have the disadvantage of possessing less strength than cast iron. In addition, aluminum alloy has a relatively low modulus of elasticity, i.e. less stiffness, compared to cast iron, disadvantageously resulting in excessive deflection and increased strain. The increased strain has been found to result in unacceptably high bending loads on the crankshaft and associated bearings. Moreover, under certain high load applications, cast iron blocks have been found to undergo unacceptable deflection.

Additionally, the loads imposed on the crankshaft during the power stroke are, in turn, transferred to the main bearing caps which secure the crankshaft against the engine block. The main bearing caps are typically bolted to the engine block through threaded portions formed in the bearing saddle. The forces imposed on the main bearing caps can be great enough to generate fatigue cracks in the threaded portion of the bearing saddles possibly resulting in failure of the engine, especially when the threads are formed in an aluminum engine block or other low density material. Thus, in heavy duty diesel engines having high assembly loads in fastening the main bearing cap to the engine block as well as large amount of stress at the threaded capscrew connection of the main bearing to the block during power strokes, it is undesirable to have an aluminum alloy present in the bearing saddle area where the capscrew holes are formed. Moreover, there is still a need for improving the stress resistance of cast iron blocks.

In order to increase the strength of the threaded holes in an engine block, there have been attempts at positioning hardened reinforcements in the bearing saddle area to provide a more secure anchor for the main bearing capscrews. U.S. Pat. No. 4,643,145 to Bolton et al. discloses one such method of reinforcement which includes ferrous reinforcements having threaded bosses for receiving crankshaft bearing cap bolts so as to resist damage to the threads and mitigate forces caused by the engine crankshaft. The ferrous reinforcements are cast into the aluminum block and mechanically held in place by the aluminum casting. The ferrous reinforcement and the aluminum block are chosen to have substantially equal coefficients of thermal expansion thereby overcoming problems caused by differential expansion. However, requiring substantially equal coefficients of thermal expansion limits the possibilities available for the material used for the ferrous reinforcement. Further, the mechanical connection between the reinforcements and the aluminum will inherently contain distinct interfacial discontinuity between the surfaces. The heavy loads imposed on the reinforcements from the bearing cap bolts tend to increase the discontinuities between the surfaces causing the mechanical bond between the reinforcement and the aluminum block to weaken.

U.S. Pat. No. 5,501,529 to Cadle et al. discloses another ferrous insert positioned within the bearing saddle area of an aluminum engine block to support the crankshaft bearing, where the main bearing cap is attached to the ferrous insert by main bearing cap bolts which engage the insert. The ferrous insert is placed into a mold for casting the engine block and molten aluminum is poured around the ferrous insert. A ferrous powder is used to form the ferrous insert so that its surface is not fully dense, allowing the molten aluminum to flow into the holes in the structure of the insert to secure the insert to the engine block. However, this method of attaching the ferrous insert to the aluminum engine block forms a mechanical bond between the ferrous insert and the engine block similar to the bond formed in the '145 Bolton et al. patent. Again, this type of mechanical bond has a tendency to weaken when exposed to the heavy loads imposed on the inserts from the bearing cap bolts.

Another type of bearing saddle reinforcement is disclosed in U.S. Pat. No. 5,370,087 to Guimond et al., where a composite engine including a molded crankcase formed of a lightweight composite material is interconnected with a metallic bearing insert. The metallic insert is attached to a bearing cap so that the crankshaft bearings contact the metallic insert. However, manufacturing tolerances make it difficult for the metallic insert to be attached to the molded crankcase and precisely aligned with the bearing cap for engagement with the bearings. Therefore, an unnecessarily high degree of precision is required when forming the molded crankcase around the insert to ensure proper alignment of the metallic insert with the bearing cap and bearings.

There have also been attempts to improve the bond between metallic inserts and engine blocks to create greater structural integrity. For instance, U.S. Pat. No. 5,333,668 to Jorstad et al. discloses a process for metallurgically bonding an engine cylinder liner insert to an aluminum engine block cast around the insert, where the insert is coated with a metallic bonding material, such as zinc, prior to casting the aluminum engine block. The molten aluminum material then metallurgically bonds to the bonding material coating the insert. Jorstad et al. form the metallurgical bond between the cylinder liner insert and the engine block in order to provide a more continuous bond, thereby allowing for more effective heat transfer from the cylinder liner insert to the engine block. Moreover, cylinder liner inserts are utilized to provided resistance to wear within the cylinder of an aluminum engine block, but are not subjected to large vertical loads such as experienced in the bearing saddle region of the engine block in a heavy duty diesel engine.

In view of the foregoing, there is clearly a need for a reinforcement positioned within the bearing saddle area of an engine block having an improved bond between the reinforcement and the engine block capable of maintaining the bond at high engine loads. Further, there is a need for a hardened reinforcement having this improved bond which allows an engine block to be selectively reinforced in highly stressed areas, of the main bearing saddle region of the engine block.

SUMMARY OF THE INVENTION

It is an object of the present invention to overcome the aforementioned shortcomings associated with the prior art.

Another object of the present invention is to provide a bearing saddle reinforcing insert for an engine block which is selectively positioned to reinforce highly stressed areas of the bearing saddle region of the engine block.

A further object of the present invention is to provide a bearing saddle reinforcing insert for an engine block which is positioned to engage the main bearing capscrews extending into the engine block which attach a main bearing cap to the engine block.

Still another object of the present invention is to provide a bearing saddle reinforcing insert having sufficient strength to prevent fatigue cracks from initiating from the loads imposed on the insert by the main bearing capscrews.

Yet another object of the present invention is to provide a bearing saddle reinforcing insert for an engine block having a metallurgical bond between the reinforcing insert and the engine block capable of maintaining the bond at high engine loads.

It is a further object of the present invention to provide a bearing saddle reinforcing insert formed from a material having a higher modulus of elasticity than the material forming the remaining portions of the engine block in order to reduce the overall deflection of the engine block when subjected to an engine load.

It is yet another object of the present invention to provide a bearing saddle reinforcing insert having a predetermined geometry so as to provide an optimal bonding surface for the engine block as well as providing added stiffness to the engine in multiple predetermined directions.

Another object of the present invention is to provide an engine block having reinforced bearing saddle areas which is relatively inexpensive and simple to manufacture.

These as well as additional objects and advantages of the present invention are achieved by providing a bearing saddle reinforcing insert for an engine block, where the reinforcing insert is formed of a material having a higher modulus of elasticity than the modulus of the engine block material. The reinforcing insert is positioned in the bearing saddle area of the engine block adjacent to the position of an engine crankshaft, and the reinforcing insert is situated to receive the main bearing capscrews which attach a main bearing cap to the engine block in order to retain the crankshaft in place. The reinforcing insert includes a lower transverse surface extending along a lowermost position in the engine block adjacent to a crankshaft mounted to the block. The reinforcing insert includes first and second linear side surfaces which extend along planes that are not parallel to one another.

In a preferred embodiment of the present invention, the reinforcing insert is formed as a monolithic piece and cast-in-place in the bearing saddle region of the engine, where the engine block material, such as cast iron or aluminum, is cast around the reinforcing insert. The reinforcing insert may further be coated with a bonding material which forms a metallurgical bond with the engine block material as it is cast around the reinforcing insert in order to further secure the reinforcing insert in its desired position. The reinforcing insert is formed having a predetermined geometrical shape to add the optimal strength and stiffness to the engine block in multiple directions to oppose the stresses experienced by the engine block. A portion of the engine block preferably extends between the lower surface of the reinforcing insert and the main bearing shell surrounding the crankshaft. However, the reinforcing insert may be positioned so as to directly abut the main bearing shell. Similarly, a portion of the engine block preferably extends between the lower surface of the reinforcing insert and the main bearing cap, but the reinforcing insert may also be positioned so as to directly contact the main bearing cap. The reinforcing insert includes at least one threaded aperture for receiving the main bearing capscrew attaching the main bearing cap to the engine block. The linear side surfaces of the reinforcing insert are angled with respect to one another, where a width of the reinforcing insert may increase as the angled linear side surfaces extend away from the lower surface of the reinforcing insert in order to provide a greater mechanical bond with the engine block to resist displacement forces exerted on the reinforcing insert in the direction of the lower surface. Furthermore, grooves may be formed on a surface of the reinforcing insert to further assist its mechanical bond to the engine block, where the engine block material will fill the grooves as the engine block is cast around the reinforcing insert.

In another preferred embodiment of the present invention, the reinforcing insert includes a plurality of cylindrical reinforcing inserts positioned within bores formed in the bearing saddle area of the engine block. Each of the cylindrical reinforcing inserts are positioned within a respective bore formed within the engine block and extending upwardly from a portion of the engine block which engages the main bearing cap. The inserts are formed separately and a portion of the engine block extends between the cylindrical reinforcing inserts and the main bearing shell surrounding the crankshaft. The cylindrical reinforcing inserts are coated with a bonding material which is metallurgically bonded to engine block. The cylindrical reinforcing inserts extend along axes that are not parallel to each other. The cylindrical reinforcing inserts include a threaded aperture for receiving a main bearing capscrew attaching a main bearing cap to the engine block, wherein the lower surface of the cylindrical reinforcing inserts abuts an adjacent portion of the main bearing cap. This aperture may be machined into the inserts after the inserts have been bonded to the block. These cylindrical inserts may also be cast in place.

DETAILED DESCRIPTION OF THE PREFERRED EMBODIMENT

Figure 1:
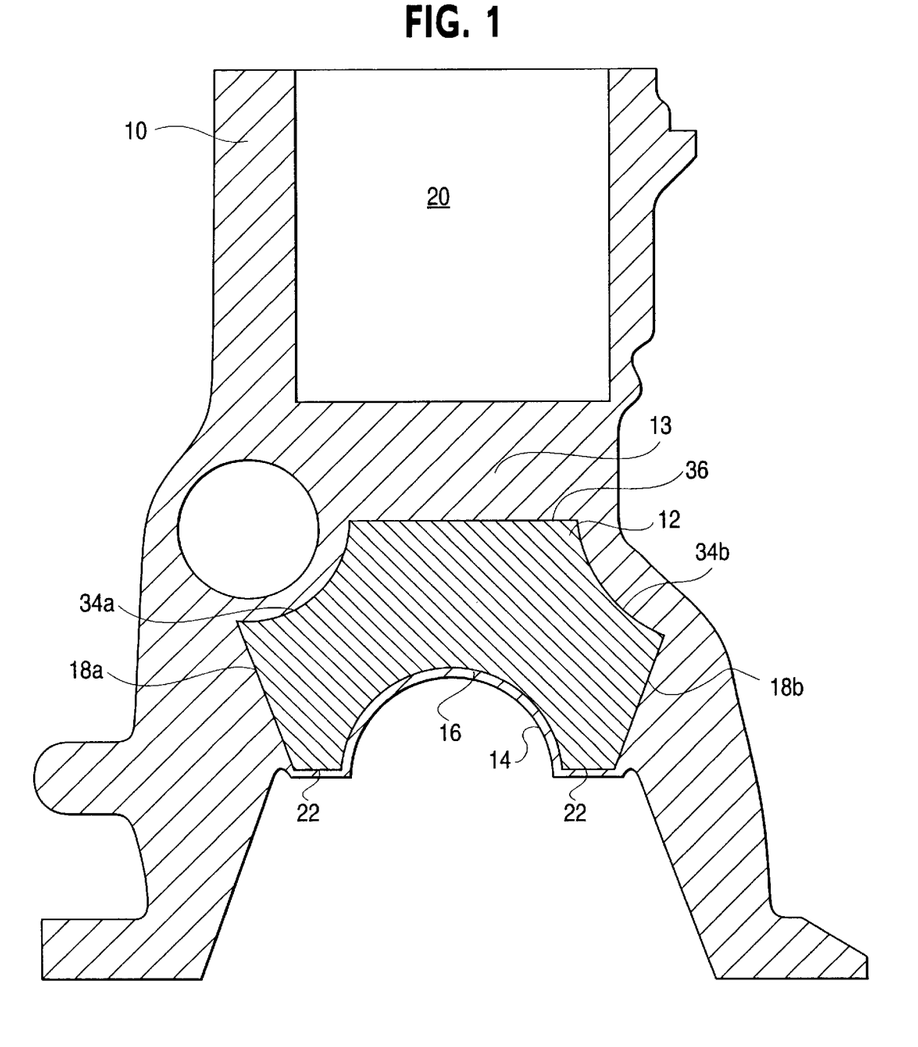
FIG. 1 is a cross-sectional view of the engine block having a monolithic reinforcing insert positioned within the bearing saddle region thereof in accordance with a preferred embodiment of the present invention.

Referring now to FIG. 1, an engine block 10 is illustrated having a reinforcing insert 12 positioned within the crankshaft bearing saddle region of one transverse wall, or scantling 13, of the engine block 10. The engine block 10 will typically include a plurality of transverse walls, each having a bearing saddle region, positioned at spaced locations along the length of a crankshaft supported by the block. Although only one transverse wall 13 is shown, it should be understood that the insert designs of the present invention may be applied to the bearing saddle regions of any or all of the transverse walls of an engine block.

The reinforcing insert 12 is formed of a high strength, fatigue resistant material in order to selectively increase the strength and stiffness of the bearing saddle region. Since aluminum alloys have a lower modulus of elasticity than cast iron, which has been conventionally used for forming engine block due to its high strength, engine blocks formed from aluminum alloys tend to possess a greater degree of vertical stretch or displacement during the power stroke within the engine cylinder. Moreover, cast iron engine blocks may also experience unacceptable levels of vertical stretch or may develop fatigue cracks due to excessive stress. Therefore, the reinforcing insert 12 is formed of a material having a higher modulus of elasticity than the modulus of the engine block material in order to reduce the overall deflection of the engine block as compared to an unreinforced engine block. For example, an aluminum or aluminum alloy engine block may be reinforced with an insert formed of steel, stainless steel, gray iron, ductile iron or another material having a greater modulus of elasticity than aluminum, such as a metal matrix composite. Also, a cast iron engine block may be reinforced with an insert formed of steel, stainless steel or any other material having a greater modulus of elasticity than gray iron, e.g. a metal alloy. Reducing the deflection of the engine block prevents unacceptable bending loads from being imposed on the crankshaft and respective bearings.

The reinforcing insert 12 is positioned within the engine block 10 adjacent to the location where an engine crankshaft is secured to the engine block 10. The engine block 10 includes a semi-circular portion 14 formed therein for accommodating the crankshaft, and the reinforcing insert 12 similarly possesses a semi-circular region 16 in the area adjacent to semi-circular portion 14. The reinforcing insert 12 includes opposing linear side surfaces 18a and 18b which extend along planes that are not parallel to each other. While the reinforcing insert 12 is shown as being positioned beneath a cylinder bore 20, the reinforcing insert 12 may be positioned in any transverse wall 13 within the engine block 10 along the length of the crankshaft.

The reinforcing insert 12 is preferably formed having a complex geometry in order to provide strength and stiffness in multiple directions. The shape of reinforcing insert 12 provides optimal strength and stiffness to the engine block in the desired directions to oppose the stresses experienced by the engine block 10. The linear side surfaces 18a and 18b are angled with respect to one another, where a width of the reinforcing insert preferably increases as the linear side surfaces 18a and 18b extend away from a lower transverse surface 22 in order to resist displacement forces exerted on the reinforcing insert in the direction of the lower surface 22 and provide a greater mechanical bond with the engine block 10.

In the preferred embodiment of the present invention shown in FIG. 1, the reinforcing insert 12 is formed as a monolithic piece of material and cast-in-place in the bearing saddle region of the engine, where the engine block material is cast around the reinforcing insert 12. The reinforcing insert may further be coated with a bonding material, such as zinc, zinc alloys, nickel, silver, copper-brazing alloys or any other material capable of forming a metallurgical bond with the engine block material as it is cast around the reinforcing insert, in order to further secure the reinforcing insert in its desired position. As the molten engine block material, i.e. aluminum or cast iron, is poured into the mold to surround the reinforcing insert 12, the molten engine block material combines with the bonding material coating the reinforcing insert 12 to form the metallurgical bond. Furthermore, grooves may be formed on the outer surface of the reinforcing insert 12 to enhance the mechanical bond to the engine block, since the molten engine block material will fill the grooves as the engine block is cast around the reinforcing insert.

Figure 2:
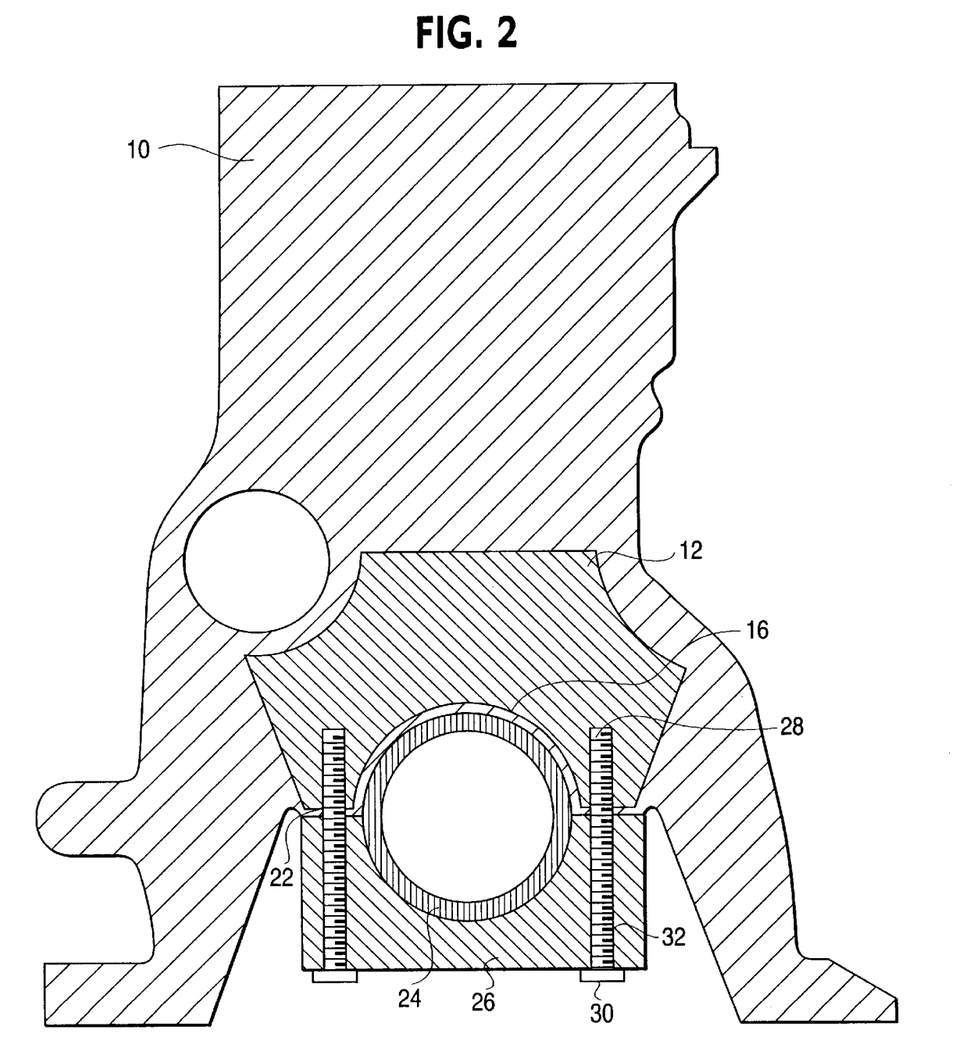
FIG. 2 is a cross-sectional view of the engine block and reinforcing insert of FIG. 1 having a main bearing cap attached thereto.

The reinforcing insert 12 includes the lower transverse surface 22 that extends between the linear side surfaces 18a and 18b and adjacent to the crankshaft extending beneath the bearing saddle region of the engine block. A portion of the engine block 10 preferably extends between the lower surface 22 of the reinforcing insert 12 and a main bearing shell 24 surrounding the crankshaft, as shown in FIG. 2. By forming a portion of the engine block 10 between the lower surface 22 of the reinforcing insert 12 and the main bearing shell 24 and main bearing cap 26, a precise fitting relationship between the engine block 10 and the other components can consistently be achieved when forming the engine block 10 since the mold for the engine block 10 can be precisely formed in a consistent manner. However, it is understood that the reinforcing insert may alternatively be positioned so as to directly abut the main bearing shell 24 to provide additional resistance to wear. Similarly, the reinforcing insert may alternatively be positioned so as to directly contact the main bearing cap 26.

As shown in FIG. 2, the reinforcing insert 12 includes a pair of threaded apertures 28 which are formed in the lower surface 22, where the threaded apertures 28 are formed on opposite sides of semi-circular region 16. Each of the threaded apertures 28 receives a main bearing capscrew 30 which attaches the main bearing cap 26 to the engine block 10. The main bearing capscrew 30 extends through an aperture 32 formed in the portion of the engine block 10 beneath the lower surface 22 of the reinforcing insert 12 and in alignment with aperture 28. Since the firing load from the power stroke is transferred through the crankshaft to the main bearing cap 26 and, in turn, to the main bearing capscrews 30, it is advantageous for the main bearing capscrews 30 to threadingly engage the reinforcing insert 12 to provide the necessary high strength and fatigue resistance to prevent fatigue cracks from initiating in the threading engagement with the engine block 10. Therein, the threads in the reinforcing insert 12 provide additional strength to resist being damaged, worn or even stripped and thus preventing weakening of the connection at the capscrews 30 thereby ensuring secure mounting of main bearing cap 26 and the crankshaft throughout engine operation.

The reinforcing insert 12 is shaped to maximize the reduction of stress in the bearing saddle region of the engine block 10 while also accounting for the varying shape of the engine block 10. As shown in FIGS. 1 and 2, the reinforcing insert 12 is shaped to have an expanding width as the reinforcing insert 12 extends away from lower surface 22, where this shape assists in preventing the reinforcing insert 12 from being displaced from its position within the engine block 10. Furthermore, the reinforcing insert 12 includes curved portions 34a and 34b which taper the reinforcing insert 12 as it extends toward an upper surface 36. The curved portions 34a and 34b are shaped so as to accommodate decreased widths of the engine block 10 and passages formed within the engine block 10.

Figure 3:
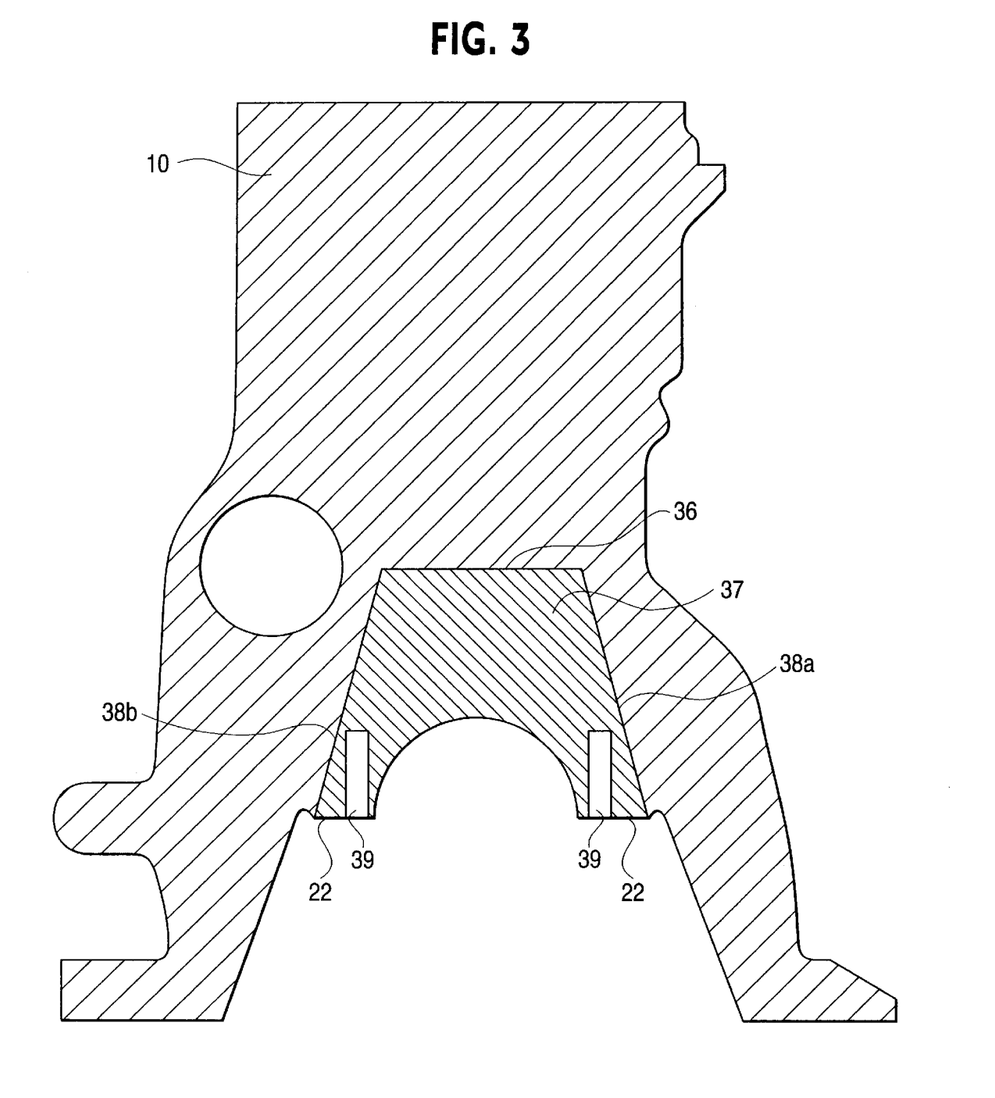
FIG. 3 is a cross-sectional view of the engine block having a monolithic reinforcing insert positioned within the bearing saddle region thereof in accordance with another embodiment of the present invention.

Another reinforcing insert which reduces stresses in the bearing saddle region of the engine block 10 while forming a strong bond with the engine block 10 to resist displacement is shown in FIG. 3. The reinforcing insert 37 is very similar to the reinforcing insert 12 of the first embodiment except that the insert 37 includes tapering linear side surfaces 38*a* and 38*b* which extend from lower surface 22 in a converging manner as opposed to a diverging manner. Thus, the width of the reinforcing insert 12 is decreased as it extends toward upper surface 36, as shown in FIG. 3. This "A" shape positions the insert material only on those areas of the bearing saddle most in need of strengthening and stiffening while providing material for positioning of bores 39. As a result, this "A" shape design reduces the weight of the engine block relative to the embodiment of FIGS. 1 and 2.

Figure 4:
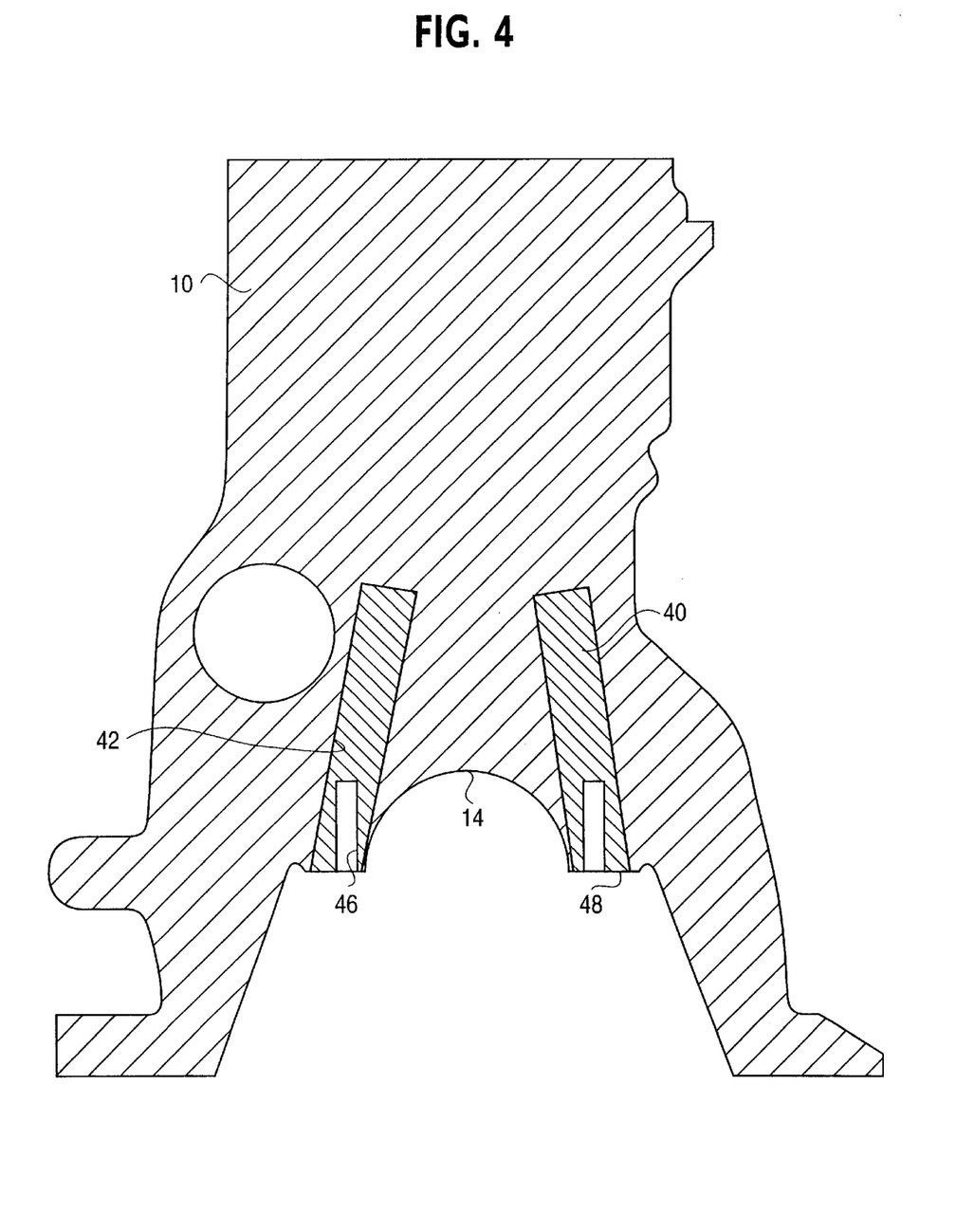
FIG. 4 is a cross-sectional view of the engine block having a multiple reinforcing inserts positioned within the bearing saddle region thereof in accordance with yet another embodiment of the present invention.

Referring now to FIG. 4, another preferred embodiment of the present invention is illustrated where the reinforcing insert includes a plurality of cylindrical reinforcing inserts 40 positioned within bores 42 formed in the bearing saddle area of the engine block 10. Each of the cylindrical reinforcing inserts 40 are positioned within the respective bore 42 formed within the engine block 10 extending upwardly from a portion 44 of the engine block 10 which engages the main bearing cap 26. The bores 42 are formed to allow a portion of the engine block 10 to extend between the cylindrical reinforcing inserts 40 and the semi-circular portion 14 formed in the engine block 10 adjacent to the main bearing shell 24. After the engine block 10 is cast, bores 42 are drilled into the engine block 10 and the cylindrical reinforcing inserts 40 are positioned within bores 42. Alternatively, bores 42 may be cast into block 10. The cylindrical reinforcing inserts 40 are coated with a bonding material which forms a metallurgical bond with the engine block material by heating. This secures the reinforcing inserts 40 in respective bores 42. The cylindrical reinforcing inserts 40 are each positioned along a central axis extending angularly upwardly from a lower surface 48 of the insert. Preferably, the inserts 40 extends in a converging, nonparallel manner toward the top of the engine block. This positioning angle tends to secure the inserts 40 against loading forces acting downwardly thereby preventing damage to or weakening the bond. Each cylindrical reinforcing insert 40 includes a threaded aperture 46 for receiving a main bearing capscrew 30 attaching a main bearing cap 26 to the engine block 10. These are preferably machined into the inserts after the inserts are bonded in place. The lower surface 48 of each cylindrical reinforcing insert 40 abuts an adjacent portion of the main bearing cap. In another preferred embodiment of the present invention, the cylindrical reinforcing inserts 40 can be cast in place. This eliminates the need to drill the bores 42.

The location of the cylindrical reinforcing inserts 40 optimally reinforces the bearing saddle region of the engine block 10 to provide added vertical stiffness and strength in this region. The length of the cylindrical reinforcing insert 40 reduces deflection of the engine block 10 by reducing the overall strain in this region. Similar to the above-described embodiments, the cylindrical reinforcing inserts 40 are formed of a high strength, fatigue resistant material having a higher modulus of elasticity than the modulus of the engine block material in order to reduce the overall deflection of the engine block as compared to an unreinforced engine block. This embodiment is particularly advantageous in that the bearing saddle areas of existing engines can be retrofit with reinforcing inserts 40.

Figure 5:
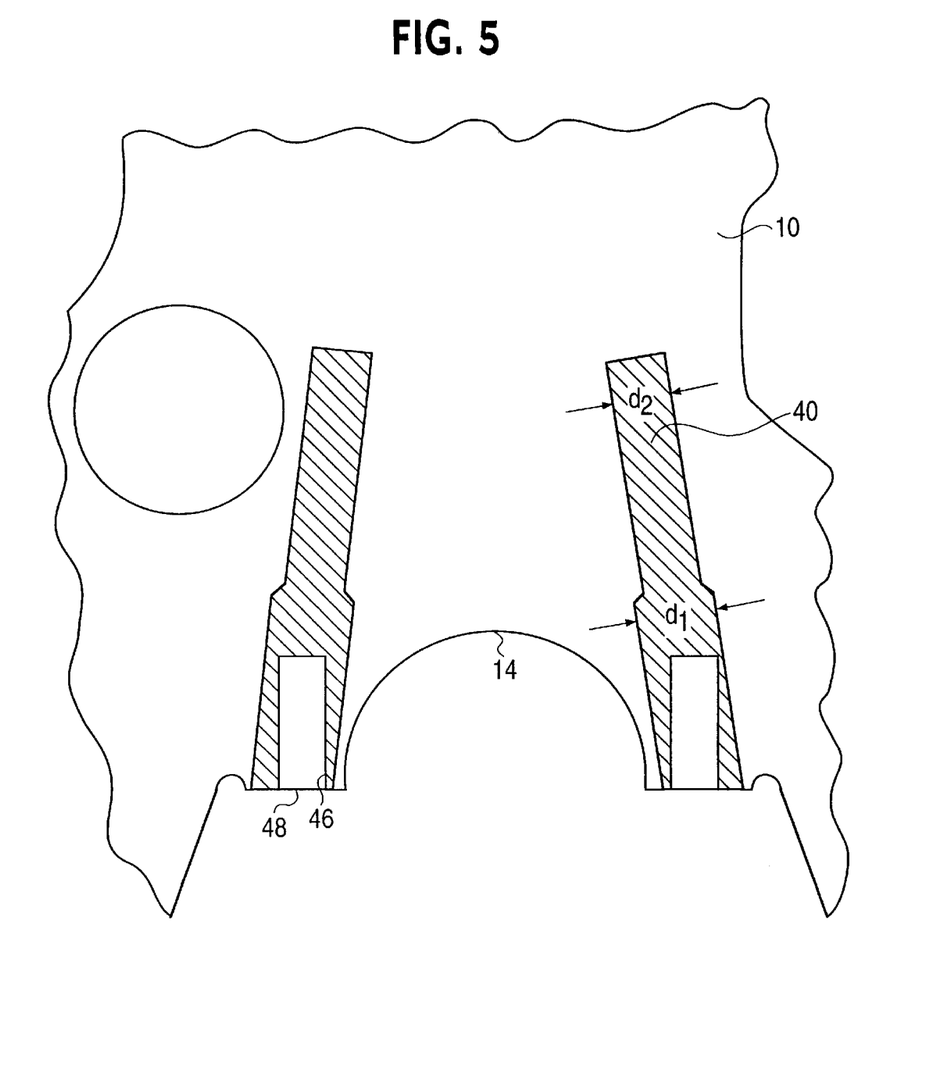
FIG. 5 is a cross-sectional view of an alternative embodiment of the engine block and reinforcing insert of FIG. 4.

As shown in FIG. 4, the cylindrical reinforcing inserts 40 may be angled with respect to one another in order to accommodate the shape of the engine block 10 while having a sufficient length to provide the necessary vertical reinforcement. The cylindrical reinforcing inserts 40 and apertures 42 may also be formed having multiple diameters, where a larger diameter portion exists near the lower surface of the cylindrical reinforcing insert 40, as shown in FIG. 5. The larger diameter, $d_1$, provides a sufficient volume of material to permit the formation of apertures 46 and effective support of main bearing capscrew 30. The diameter of the cylindrical reinforcing inserts 40 decreases farther from surface 48 to form a smaller diameter portion having a diameter, $d_2$. By forming the smaller diameter portion at the upper portion of the transverse wall 13, the cylindrical reinforcing inserts 40 can extend a sufficient distance into the transverse wall 13 to provide the necessary additional vertical stiffness and strength without interfering with existing passages and shapes designed into the engine block.

As can be seen from the foregoing, a bearing saddle reinforcing insert formed in accordance with the present invention provides a bearing saddle reinforcing insert formed from a material having a higher modulus of elasticity than the material forming the remaining portions of the engine block in order to selectively increase the strength and stiffness of the engine block to reduce the overall deflection of the engine block when subjected to an engine load. Moreover, by forming a bearing saddle reinforcement in accordance with the present invention, a reinforcing insert having a predetermined geometry can be formed so as to provide an optimal bonding surface for the engine block as well as providing adding stiffness and strength to the engine in multiple directions.

What is claimed is:

1. An engine block formed of an engine block material and adapted to support an engine crankshaft extending along a central axis, comprising:

a plurality of transverse walls, each of said transverse walls including a bearing saddle area for supporting the crankshaft;

a plurality of reinforcing inserts positioned in said bearing saddle area, said plurality of inserts being formed of a material having a higher modulus of elasticity than the modulus of elasticity of the engine block material and including a first reinforcing insert positioned on one side of the central axis within a respective bore formed in said bearing saddle area and a second reinforcing insert, separate from said first reinforcing insert, and positioned on an opposite side of the central axis within a respective bore formed in said bearing saddle area, each of said first and said second reinforcing inserts including cylindrical portions metallurgically bonded to said material of the engine block and including a threaded aperture for receiving a main bearing capscrew which attaches a main bearing cap to the engine block.

2. The engine block as defined in claim 1, wherein said first and said second reinforcing inserts are substantially cylindrically shaped and extend along respective axes that are nonparallel to each other.

3. The engine block as defined in claim 2, wherein said bearing saddle area includes a lower transverse surface and said first and said second reinforcing inserts extend convergingly away from said lower transverse surface.

4. The engine block as defined in claim 1, wherein said engine block material is cast iron and said insert material is one of steel, stainless steel and a metal alloy.

5. The engine block as defined in claim 1, wherein said engine block material is one of aluminum and an aluminum alloy, and said insert material is one of steel, stainless steel, gray iron, ductile iron and a metal matrix composite.

6. The engine block as defined in claim 2, wherein said first and said second cylindrically shaped reinforcing inserts include a first cylindrical portion having a first diameter and a second cylindrical portion having a second diameter smaller than said first diameter.

* * * * *